US012560498B2

(12) United States Patent
Despesse

(10) Patent No.: US 12,560,498 B2
(45) Date of Patent: Feb. 24, 2026

(54) METHOD AND SYSTEM FOR DETERMINING THE STATE OF A SENSOR WHOSE MECHANICAL BEHAVIOUR IS NONLINEAR AS A FUNCTION OF THE AMPLITUDE OF THE PRESSURE EXERTED

(71) Applicant: COMMISSARIAT A L'ENERGIE ATOMIQUE ET AUX ENERGIES ALTERNATIVES, Paris (FR)

(72) Inventor: Ghislain Despesse, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 333 days.

(21) Appl. No.: 18/072,556

(22) Filed: Nov. 30, 2022

(65) Prior Publication Data

US 2023/0204440 A1      Jun. 29, 2023

(30) Foreign Application Priority Data

Dec. 23, 2021    (FR) ...................................... 2114427

(51) Int. Cl.
*G01L 1/22* (2006.01)
*G01L 1/25* (2006.01)
*H04R 7/08* (2006.01)

(52) U.S. Cl.
CPC ............ *G01L 1/2275* (2013.01); *G01L 1/225* (2013.01); *G01L 1/2287* (2013.01); *G01L 1/255* (2013.01); *H04R 7/08* (2013.01)

(58) Field of Classification Search
CPC ......... G01L 1/10; G01L 1/225; G01L 1/2275; G01L 1/255; G01L 5/243; G01L 11/04; G01L 11/06
See application file for complete search history.

(56) References Cited

U.S. PATENT DOCUMENTS 4,604,898 A * 8/1986 Gohin ..................... G01L 11/04
                                                          324/636
5,168,758 A * 12/1992 Wolfer ................. B23Q 17/098
                                                          73/862.541
(Continued)

FOREIGN PATENT DOCUMENTS

FR        2 739 925 A1      4/1997
FR        2 771 506 A1      5/1999

OTHER PUBLICATIONS

Szermer, et al., "Capacitive 3-Axis MEMS Accelerometer for Medipost: A Portable System Dedicated to Monitoring Imbalance Disorders", Sensors, vol. 21, 3564, 2021.

*Primary Examiner* — Tran M. Tran
(74) *Attorney, Agent, or Firm* — BakerHostetler

(57) ABSTRACT

A method for determining the state of at least one sensor whose mechanical behaviour is nonlinear as a function of the amplitude of the pressure exerted against the sensor, the sensor and an electromechanical transducer being able to be coupled to a support, the method comprising the steps of: applying an electrical signal at a first amplitude to the terminals of the first electromechanical transducer, and determining a first set of values of a parameter characteristic of the electrical impedance of the first electromechanical transducer in response to the application of the electrical signal; applying the electrical signal at a second amplitude to the terminals of the first electromechanical transducer, and determining a second set of values of the parameter characteristic of the impedance; measuring a deviation between the first set of values and the second set of values; determining a state of the sensor as a function of the deviation between the first set of values and the second set of values.

14 Claims, 9 Drawing Sheets

(56) References Cited

U.S. PATENT DOCUMENTS

| | | | | |
|---|---|---|---|---|
| 5,415,508 A * | 5/1995 | Pleva | G01L 5/243 | |
| | | | 411/14 | |
| 5,594,705 A | 1/1997 | Connor et al. | | |
| 7,698,949 B2 * | 4/2010 | Akdeniz | G01N 29/2475 | |
| | | | 73/632 | |
| 8,393,224 B2 * | 3/2013 | Ballandras | G01P 15/0922 | |
| | | | 73/778 | |
| 8,844,364 B2 * | 9/2014 | Takahashi | F16B 31/02 | |
| | | | 73/761 | |
| 9,865,989 B2 * | 1/2018 | Ishaug | H04B 10/2537 | |
| 11,458,504 B2 * | 10/2022 | Shulepov | B06B 1/0292 | |
| 11,864,947 B2 * | 1/2024 | Loebl | B06B 1/0215 | |
| 12,158,389 B2 * | 12/2024 | Minotani | G01M 13/00 | |
| 2010/0010750 A1 | 1/2010 | Baron et al. | | |
| 2011/0132098 A1 | 6/2011 | Ballandras et al. | | |
| 2022/0321237 A1 * | 10/2022 | Gebhart | H04B 5/73 | |
| 2023/0194354 A1 * | 6/2023 | Despesse | G01N 29/50 | |
| | | | 374/178 | |
| 2023/0243382 A1 * | 8/2023 | Pfarr | F16B 31/028 | |
| | | | 411/10 | |
| 2024/0263664 A1 * | 8/2024 | Biehl | F16B 31/028 | |

* cited by examiner

METHOD AND SYSTEM FOR DETERMINING THE STATE OF A SENSOR WHOSE MECHANICAL BEHAVIOUR IS NONLINEAR AS A FUNCTION OF THE AMPLITUDE OF THE PRESSURE EXERTED

CROSS-REFERENCE TO RELATED APPLICATION

This application claims priority to foreign French patent application No. FR 2114427, filed on Dec. 23, 2021, the disclosure of which is incorporated by reference in its entirety.

FIELD OF THE INVENTION

The invention relates generally to measurement systems, and in particular to a method and a system for determining the state of a sensor through a support.

In some fields, measurement systems are used to perform measurements through a conductive support or a conductive wall, such as a pipeline, in a medium that is difficult to access, dangerous, corrosive or hostile, and to render this data accessible. Such measurement systems conventionally use a sensor.

BACKGROUND

However, the medium in which the sensor is located may be difficult to access (for example inside a hull of a boat, a block of concrete, a block of metal, pipelines, tanks). It may therefore, in some cases, be difficult to use active sensors powered by cells or by batteries, which need to be changed or charged regularly.

It is known to use radio frequency identification (or RFID) devices, in which measurements from a sensor are stored and remotely retrieved by using markers called "radio tanks". However, the RFID technology does not work when the support separating the sensor interrogation system and the sensor itself is conductive.

Moreover, the dimensions of the radio antennas can make them difficult to incorporate in the medium. Indeed, the wavelength of an acoustic wave is extremely shorter than a radio wave (factor<1/1000), which makes it possible to produce much more compact interrogation systems. The dimensions of the interrogation systems are typically of the order of a wavelength or a few wavelengths.

In the interrogation systems that operate with radio waves, the transmission medium (air, vacuum) can be considered uniform and quasi-infinite, and it interacts only very little with the signal.

On the other hand, in the interrogation systems that operate with acoustic waves, the medium interacts strongly with the signal. Indeed, the propagation speed depends on the materials, the medium not being infinite, and there can be many uncontrolled echoes.

One known solution, described in the document U.S. Pat. No. 5,594,705, discloses an acoustic transformer for coupling energy through a support (for example a hull of a boat). The acoustic transformer comprises a first transducer coupled to the support, a second transducer coupled to the support, opposite the first transducer, a generator coupled to the first transducer to apply an alternating signal, and means for varying the charge on the side of the second transducer, in order to induce variations in the alternating signal at the terminals of the first transducer.

Such a solution uses charge-modulation communication. Indeed, the means for varying the charge on the side of the second transducer must be powered by an electronic circuit, which then interprets sensor information and translates it into a charge modulation. Such a device does not contain a battery but requires an active circuit (modulator) which integrates a sensor and transforms the measured datum into a modulation signal.

Other passive solutions exist in the RF field. The properties of the sensor are then directly modified by the physical parameter to be measured (sensor antenna).

For example, it is known that a variable resistor can be inserted into the sensor to obtain a thermistor whose resistance varies with temperature, or a strain gauge whose resistance varies as a function of a deformation/strain.

It is also known practice to insert a variable capacitor into the sensor to obtain a capacitive accelerometer (capacitance dependent on acceleration), a capacitor with dielectric properties which depend on the temperature/strain, on even a capacitive sensor (proximity sensor, distance measurement, position measurement, presence measurement, liquid filling measurement).

A resonator can also be inserted into the sensor to detect a change of resonance frequency with the temperature or the mechanical strain, changing the frequency response of the antenna. Such an operation is used conventionally in surface acoustic wave sensors (SAW sensors).

This type of sensor antenna provides substantially the same response as seen by the RF interrogator, regardless of the environment, provided that this environment is not electrically conductive.

However, when it comes to the acoustic interrogators, such an assumption cannot be made. Indeed, the acoustic wave is not propagated in a vacuum and in air because the transmissibility energy levels are low compared to what can be transmitted through solids or liquids.

Because of this, acoustic propagation is highly dependent on the physical materials present. The assumptions of a known, isotropic and quasi-infinite, medium are no longer valid. The deformation of the signal linked to this channel can no longer be determined generically, and each situation must be modelled to deduce therefrom the effect of the channel in each of the cases and thus work out a specific change of one of the properties of the acoustic sensor.

There is thus a need for methods and systems for determining a state of a sensor by a passive acoustic interrogation mode, which does not require the propagation channel to be characterized.

SUMMARY OF THE INVENTION

The invention aims to remedy the abovementioned drawbacks, by proposing a method that is flexible and simple to use.

One subject of the invention is therefore a method for determining the state of at least one sensor whose mechanical behaviour is nonlinear as a function of the amplitude of the pressure exerted against said sensor, said sensor and an electromechanical transducer being able to be coupled to a support, the method comprising the steps of:

applying an electrical signal at a first amplitude to the terminals of the electromechanical transducer, and determining a first set of values of a parameter characteristic of the electrical impedance of the electromechanical transducer in response to the application of said electrical signal;

applying said electrical signal at a second amplitude to the terminals of the electromechanical transducer, and determining a second set of values of the parameter characteristic of the impedance;

measuring a deviation between the first set of values and the second set of values;

determining a state of the sensor as a function of the deviation between the first set of values and the second set of values.

Advantageously, the sensor comprises at least one air gap, the step of determination of a state of the sensor comprising a determination of the air gap value, and:

the air gap value is considered nil if the deviation between the first set of values and the second set of values is lower than a predetermined deviation value;

the air gap value is considered as non-zero if the deviation between the first set of values and the second set of values is above said predetermined deviation value.

Advantageously, the sensor comprises at least one air gap, the method comprising the steps of:

determining a first value of a parameter characteristic of the electrical impedance of the first electromechanical transducer, at the first amplitude, determining a second value of a parameter characteristic of the electrical impedance of the first electromechanical transducer, at the second amplitude, the first value and the second value being such that the deviation is non-zero, applying the electrical signal at a third amplitude, the third amplitude lying between the first amplitude and the second amplitude, and determining a third value of a parameter characteristic of the electrical impedance of the first electromechanical transducer, at the third amplitude, determining the air gap value as a function of the first value, of the second value, and of the third value.

The invention relates also to a method for determining the level of clamping of mechanical parts disposed between a first clamping head and a second clamping head, a sensor whose mechanical behaviour is nonlinear as a function of the amplitude of the pressure exerted against said sensor being disposed between the clamping heads, an electromechanical transducer being able to be coupled to one of the clamping heads, the method comprising the steps of:

applying an electrical signal at a first amplitude to the terminals of the electromechanical transducer, and determining a first set of values of a parameter characteristic of the electrical impedance of the electromechanical transducer in response to the application of said electrical signal;

applying said electrical signal at a second amplitude to the terminals of the electromechanical transducer, and determining a second set of values of the parameter characteristic of the impedance;

measuring a deviation between the first set of values and the second set of values;

determining a clamping level as a function of the deviation between the first set of values and the second set of values.

Advantageously, the first clamping head is a screwhead, the second clamping head is a nut, and the sensor is incorporated in a washer.

The invention relates also to a system for determining the state of at least one sensor whose mechanical behaviour is nonlinear as a function of the amplitude of the pressure exerted against said sensor, said sensor and an electromechanical transducer being able to be coupled to a support, the system comprising a sensor state determination unit, the sensor state determination unit being configured to:

apply an electrical signal at a first amplitude to the terminals of the first electromechanical transducer, and determine a first set of values of a parameter characteristic of the electrical impedance of the first electromechanical transducer in response to the application of said electrical signal;

apply said electrical signal at a second amplitude to the terminals of the first electromechanical transducer, and determine a second set of values of the parameter characteristic of the impedance;

measure a deviation between the first set of values and the second set of values;

determine a state of the sensor as a function of the deviation between the first set of values and the second set of values.

Advantageously, the sensor comprises at least one air gap.

Advantageously, said at least one air gap is produced in the form of a disjointed repeated pattern.

Advantageously, the sensor comprises a first air gap and a second air gap, the first air gap and the second air gap both having a rectilinear profile or a dished profile, the first air gap and the second air gap being superposed, the first air gap and the second air gap comprising different inter-plate spacings.

Advantageously, the sensor comprises a first air gap and a second air gap, the first air gap and the second air gap both having a rectilinear profile, the first air gap and the second air gap being aligned, the first air gap and the second air gap comprising different inter-plate spacings.

Advantageously, the sensor comprises a first air gap and a second air gap, the first air gap and the second air gap both having a rectilinear profile or a dished profile, the first air gap and the second air gap being superposed and sufficiently close to one another, such that they form a diaphragm, whose thickness is less than the wavelength of the acoustic wave being propagated in the sensor.

Advantageously, the sensor comprises an air gap having a profile whose thickness varies progressively.

Advantageously, the sensor comprises an air gap having a serrated profile, the height of at least some of the serrations being variable.

Advantageously, the sensor comprises a first air gap and a second air gap, produced in the form of a repeated pattern, the first air gap and the second air gap being superposed, the edge of each pattern of the first air gap being aligned with the centre of a pattern of the second air gap, and vice versa.

Advantageously, the pattern comprises a rectilinear air gap part, that can be brought into contact when a pressure is exerted against the sensor, and two pillars disposed on either side of the rectilinear air gap part, at right angles to said air gap part.

Advantageously, the sensor is a force sensor, or a strain gauge, or a gas pressure sensor, or a liquid sensor, or a temperature sensor, or a humid sensor.

BRIEF DESCRIPTION OF THE DRAWINGS

Other features, details and advantages of the invention will emerge on reading the description given with reference to the attached drawings that are given by way of example.

DETAILED DESCRIPTION

Figure 1:
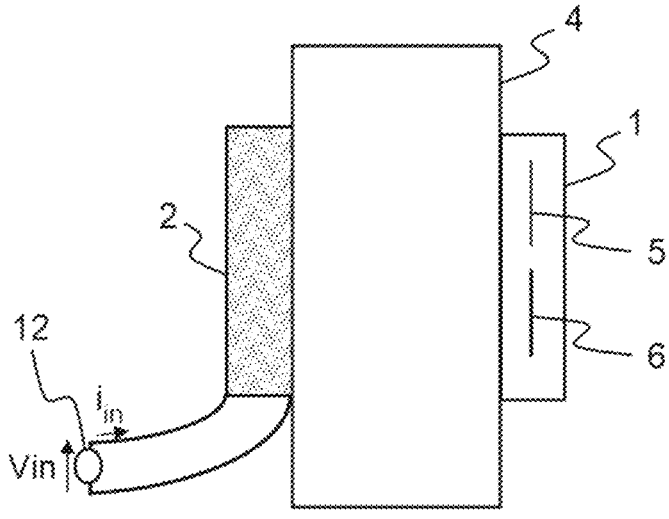
FIG. 1 is a diagram representing a system according to the invention.

FIG. 1 illustrates the configuration in which the method can be applied. An electromechanical transducer 2 and a sensor 1 whose electrical behaviour is nonlinear as a function of the pressure exerted against the sensor are disposed on either side of a support 4. Other configurations can be envisaged, for example the sensor 1 is disposed on the same side of the support as the electromechanical transducer 2, but in an inaccessible place. The support is a rigid mechanical part, in which a vibratory wave generated by one of the electromechanical transducers can be propagated.

The electromechanical transducer 2 and the sensor 1 are coupled to the support 4 such that the propagation of the vibratory wave between the transducers is optimal. The electromechanical transducer 2 and the sensor 1 can for example be glued to the support 4, or fixed for example via fixing lugs or kept in contact by the mechanical force of a magnet or even alongside the electromechanical transducer 2, kept in contact by a pressure exerted by the user.

In FIG. 1, the support has dimensions close to those of the electromechanical transducer 2 and of the sensor 1, but the invention can be applied to supports of variable lengths, ranging for example from a small mechanical part of engine part type, to a very large part such as a pipeline.

In the case of a part of pipeline type, it is understood that the sensor 1 is disposed inside the pipeline, at a point that is difficult to access. The sensor 1 can also be disposed on the outside, at a remote point that is difficult to access (inside a bore hole, in a tank containing a liquid, or even in a pressure pipeline which can be on a steep wall and difficult to access, for example in mountains). In this case, it may be advantageous to be able to interrogate remote sensors from points where the pipeline is easily accessible.).

The electromechanical transducer 2 and the sensor 1 are preferably disposed in such a way as to face one another through the support 4, in order to optimise the transmission of power between the electromechanical transducer 2 and the sensor 1.

The invention applies particularly to metal supports 4, for which RFID interrogation is unreliable. However, the invention can be extended to any type of support 4, without limitation linked to the material.

The electromechanical transducer is designed to receive energy from an electrical system and supply energy to a mechanical system, or vice versa. The electromechanical transducer can advantageously be an electroacoustic transducer, and more particularly a piezoelectric transducer. The piezoelectric transducers comprise an electro-active material which induces a voltage when a pressure or a strain is applied to it, and vice versa. Other electromechanical transducers can be envisaged, for example electret electrostatic transducers, or electromagnetic transducers.

"Sensor whose mechanical behaviour is nonlinear as a function of the pressure exerted against said sensor" is understood to mean an element whose mechanical behaviour differs fundamentally according to the value of the pressure exerted against the sensor.

The idea on which the invention is based is to be able to measure the state of a sensor remotely via a differentiation measurement of electrical impedance of an electromechanical transducer, from at least two electrical impedance measurements at two different amplitudes.

It is recalled that electrical impedance measures the opposition of an electrical circuit to the passage of a sinusoidal alternating current.

A sensor state determination unit 12, comprising a voltage source, or a current source, is electrically connected to the electromechanical transducer 2, so as to impose respectively a sinusoidal voltage at a predefined maximum amplitude, or a sinusoidal current at a predefined maximum amplitude, on the other elements of the system.

The measurement of the impedance can be performed by an impedance measurement device, also called impedance meter, which can be incorporated in the sensor state determination unit 12. According to a variant, the impedance measurement can be performed in a computation device distinct from the voltage or current source, for example in a computer.

The electrical impedance of the electromechanical transducer 2 therefore corresponds to that which is "seen" by the determination unit 12.

For the various embodiments described hereinbelow, it is possible to impose a voltage Vin using a voltage source, and to measure the current $I_{in}$ in order to determine impedance. It is also possible to impose a current intensity $I_{in}$ using a current source, and to measure the voltage Vin in order to determine the impedance. The concept of an amplitude of the measurement can be applied equally to $I_{in}$ and to Vin.

Figure 2:
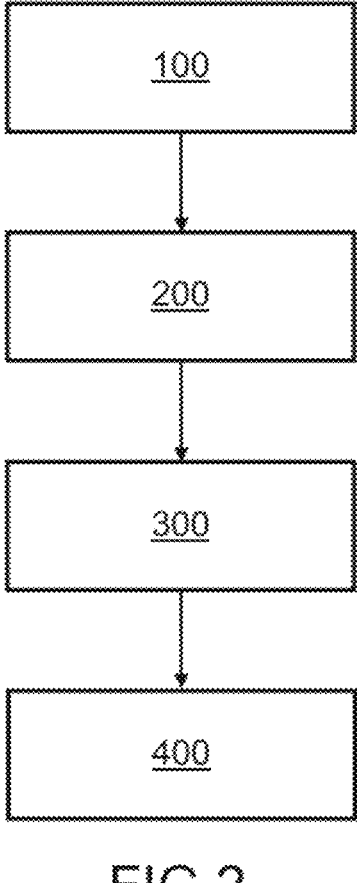
FIG. 2 is a flow diagram representing a method according to the invention.

The method comprises, in a first step 100 (FIG. 2), applying an electrical signal at a first amplitude to the terminals of the first electromechanical transducer 2, and determining a first set of values of a parameter characteristic of the impedance of the electromechanical transducer 2 in response to the application of said electrical signal.

The frequency band of the electrical signal is preferably situated around the frequency of a resonance mode of the electromechanical transducer 2.

In a second step 200 (FIG. 2), the electrical signal is applied at a second amplitude, and a second set of values of the parameter characteristic of the impedance is determined.

The information linked to the state of the sensor 1 is coded in the nonlinearity of the impedance of the sensor 1 as a function of the amplitude of the measurement signal imposed by the voltage or current source.

It is the behaviour of the sensor 1, set in motion by the support 4, which in return to this setting in motion, exhibits a mechanical counter reaction that is nonlinear with the amplitude.

The propagation channel is considered as linear, with the amplitude of the signal transmitted, unlike the sensor 1, which makes it possible to discriminate the nonlinear properties of the sensor 1 with respect to the channel.

In a third step 300 of the method (FIG. 2), a deviation between the first set of values and the second set of values is measured, according to one of the proximity criteria defined hereinbelow. The deviation corresponds to a difference between two sets of values, according to a predefined criterion.

Thus, by appropriately selecting the first and the second amplitudes, the state of the sensor 1 can be determined as a function of the deviation between the first set of values and the second set of values (fourth step 400).

The method can be repeated periodically, in order to regularly assess the state of the sensor 1. It can, alternatively or in addition, be implemented on a spot basis, for example in the event of an aberrant measurement from the sensor 1.

Figure 3:
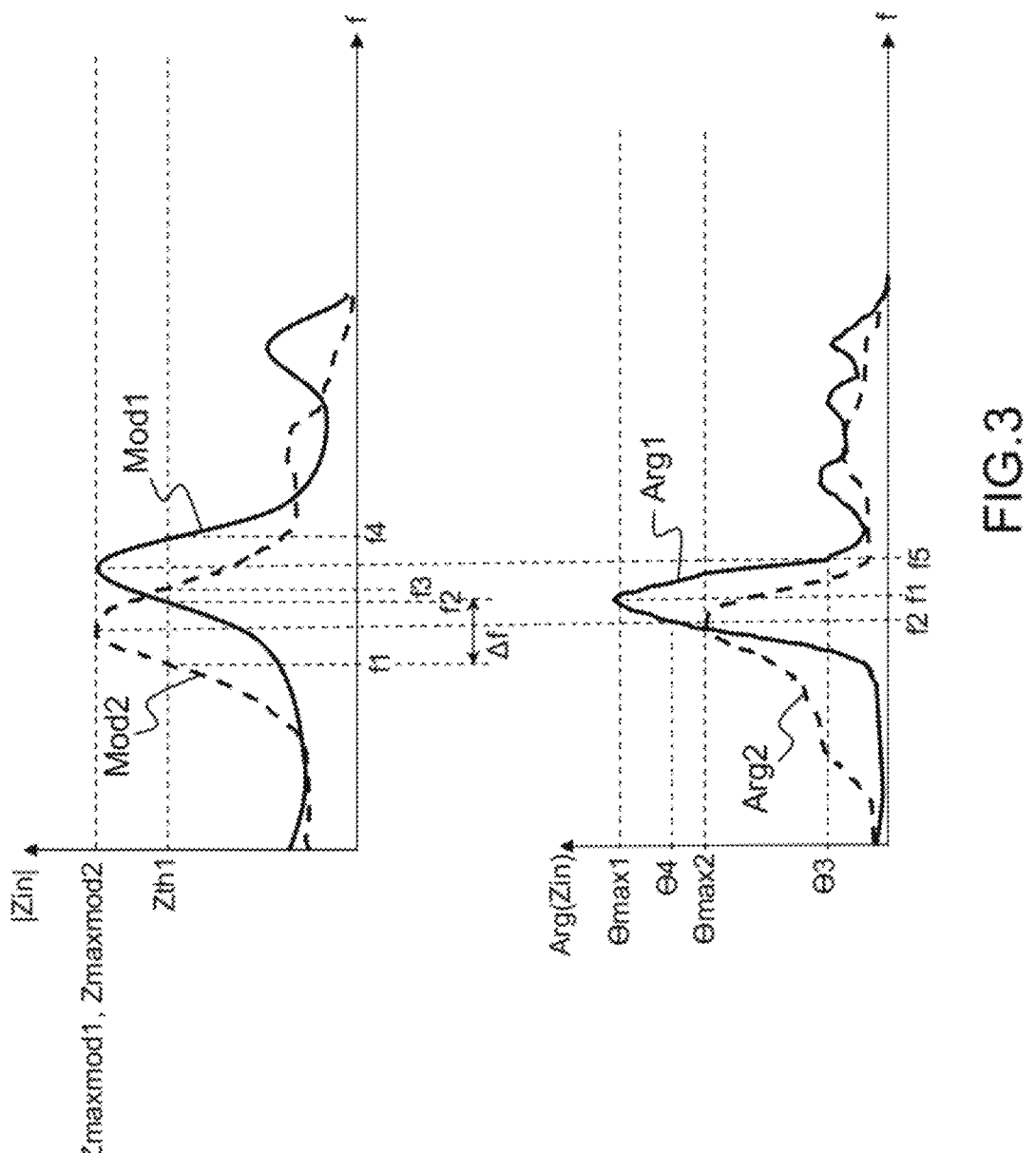
FIG. 3 is a graph representing a trend of the modulus and of the argument of the impedance as seen by the transducer, for two amplitudes of the electrical signal.

FIG. 3 illustrates two measurements that make it possible to characterize the impedance, namely the modulus (upper part of FIG. 3), and the argument (lower part of FIG. 3). The modulus corresponds to the ratio between the amplitude of the voltage and the amplitude of the current, and the argument corresponds to the difference between the phase value of the voltage and the phase value of the current.

The curve Mod1 corresponds to a plurality of measurements of the modulus of the impedance as seen by the electromechanical transducer 2, for different frequencies of the signal, at a first amplitude. For a sinusoidal signal, or more generally for an alternating signal, the amplitude corresponds to the peak value of the signal, that is to say the maximum value. The curve Mod2 corresponds to a plurality of measurements of the modulus of the impedance as seen in by the electromechanical transducer 2, for different frequencies of the signal, at a second amplitude, different from the first amplitude.

It is possible, for example, to perform the measurements for a finite set of frequencies, and then to perform an interpolation operation, in order to obtain a continuous set of values, over a predetermined range of frequencies.

The measurement frequency range is predefined, and can for example be determined as a function of the properties of the first electromechanical transducer 2 and/or of the sensor 1.

The curve Arg1 corresponds to a plurality of measurements of the argument of the impedance as seen by the electromechanical transducer 2, for different frequencies of the signal, at the first amplitude. The curve Arg2 corresponds to a plurality of measurements of the argument of the impedance as seen by the first electromechanical transducer 2, for different frequencies of the signal, at the second amplitude.

To implement the method according to the invention, it is not necessary to measure both the modulus and the argument. One of the two measurements can suffice; that depends on the definition of the deviation, as defined hereinbelow.

According to a first embodiment, the measurement of the deviation between the first set of values and the second set of values comprises the measurement of a deviation of frequencies between the transitions through a predefined impedance modulus value or through a predefined impedance argument value of the first set of values and of the second set of values.

The upper part of FIG. 3 illustrates the abovementioned embodiment, with a predefined impedance modulus value Zth1. The set of values Mod1 at the first amplitude reaches the value Zth1 for the frequencies f2 and f4. The set of values Mod2 at the second amplitude reaches the value Zth1 for the frequencies f1 and f3.

In one embodiment, only the frequencies corresponding to the first overshot of the threshold Zth1 are considered. Thus, according to this embodiment, the deviation between the first set of values Mod1 and the second set of values Mod2 corresponds to the difference Δf=f2−f1.

According to another embodiment of calculation of the deviation between the sets of values, the deviation can be defined, within a predefined range of frequencies, by the frequency deviation between the extreme value of the first set of values and the extreme value of the second set of values.

The extreme value preferably corresponds to the maximum of each set of values. In the lower part of FIG. 3, the first set of values of the argument Arg1 at the first amplitude has a maximum value θmax1, at a frequency f1, and the second set of values of the argument Arg2 at the second amplitude has a maximum value θmax2, at a frequency f2. According to this embodiment, the deviation corresponds to the difference Δf=f1−f2.

According to another embodiment illustrated by the lower part of FIG. 3, the deviation can be calculated by measuring, within the predefined range of frequencies, the modulus or argument deviation between the extremum of the first set of values and the extremum of the second set of values. The extremum corresponds preferably to the maximum value.

In the example of FIG. 3 (lower part), the deviation can be obtained by calculating Δθ=θmax1−θmax2.

According to another embodiment, the deviation corresponds to an argument difference between the first set of values and the second set of values at frequencies corresponding to an extremum (or to a predefined value) of the modulus of the first set of values and to the extremum (or to a predefined value) of the modulus of the second set of values. The extremum corresponds preferably to the maximum of each set of values.

For example, in the upper part of FIG. 3, the first set of values Mod1 of the modulus at a first amplitude, and the second set of values Mod2 of the modulus at a second amplitude, each have a maximum value, respectively Zmaxmod1 and Zmaxmod2, which are equal in FIG. 3.

The values Zmaxmod1 is reached at frequency f5, and the value Zmaxmod2 is reached at frequency f2. If it is assumed that the graph of the upper part and that of the lower part can be aligned, the value of the argument of the first set of values Arg1 at the frequency f5 has the value θ3, and the value of the argument of the second set of values Arg2 at the frequency f2 has the value θ4. According to this embodiment, the deviation corresponds to the difference Δθ=θ4−θ3.

According to another embodiment, the deviation is calculated from an intercorrelation between the two sets of measurements.

The calculation of the deviation between the set of values at the first amplitude and the set of values at the second amplitude, according to one of the abovementioned embodiments, makes it possible to determine if the parameter characteristic of the impedance (modulus or argument) of the electromechanical transducer 2, as seen by the sensor state determination unit 12, in response to the application of said electrical signal, varies, or, on the contrary, remains substantially constant, depending on whether the signal is applied with the first amplitude or with the second amplitude.

The sensor 1 advantageously comprises at least one air gap 5, such as those that can be found in electromagnetic and capacitive devices.

An example of an air gap capacitive sensor is described in the article "A Capacitive 3-Axis MEMS Accelerometer for Medipost: A Portable System Dedicated to Monitoring Imbalance Disorders" (Michal Szermer et al., Sensors 2021, 21, 3564), in particular in FIG. 1 of the article.

Any solid materials can form the two materials to be placed on either side of the air gap. Maintaining the air gap generally requires a support which keeps the two parts in place, for example using shims which keep the two parts separate with a good accuracy concerning the value of the air gap. The air gap itself is typically in a vacuum or else filled with the gas, that is to say an element that is very flexible compared to the stiffness of the material or materials forming the two sides of the air gap.

The same measurement principle can be applied reciprocally by calculating a measurement of the modulus deviation between the first set of values and the second set of values at frequencies corresponding to an argument extremum (in particular the maximum) of the first set of values (or to a predefined value) and to an argument extremum (in particular the maximum) of the second set of values (or to a predefined value).

Referring to FIG. 1, if the vibration on the side of sensor 1 situated against the support 4 does not exceed the air gap value, there is no transmission of the vibratory wave to the opposite side of the sensor 1.

If the amplitude exceeds the air gap value, there will be a transfer of vibration between the side of the sensor 1 situated against the support 4, and the opposite side.

A first measurement is performed at low amplitude, for which it is certain that the air gap does not come into contact with the support if a minimal air gap is present. A second measurement is performed with a stronger amplitude. If the impedance is identical, it can be deduced that the air gap is always in contact with the support. On the other hand, if the impedance is different, it can be deduced that there is no contact between the air gap and the support (so-called "all or nothing" operation).

By "positioning" an impedance Zin2 with respect to Zin1 (absence of contact of the air gap) and Zin3 (contact of the air gap), it is also possible to determine a linear measurement of the air gap, for example:

an air gap value which depends on the temperature (thermal expansion, bimetal effect, etc.)
an air gap value which depends on a mechanical strain/deformation
an air gap value/volume which depends on a humidity level
an air gap value which depends on an external pressure level A measurement Mes of the air gap value of the sensor can for example be deduced by relative ratios, using the following formula:

$$\text{Mes}=\alpha.\Delta(\text{Zin2}-\text{Zin1})/\Delta(\text{Zin3}-\text{Zin1})+\beta \qquad (1)$$

In which $\Delta$ represents the deviation on the parameter characteristic of the impedance, $\alpha$ and $\beta$ are predetermined parameters specific to the sensor 1. The deviation can be measured according to one of the embodiments previously described.

Figure 4:
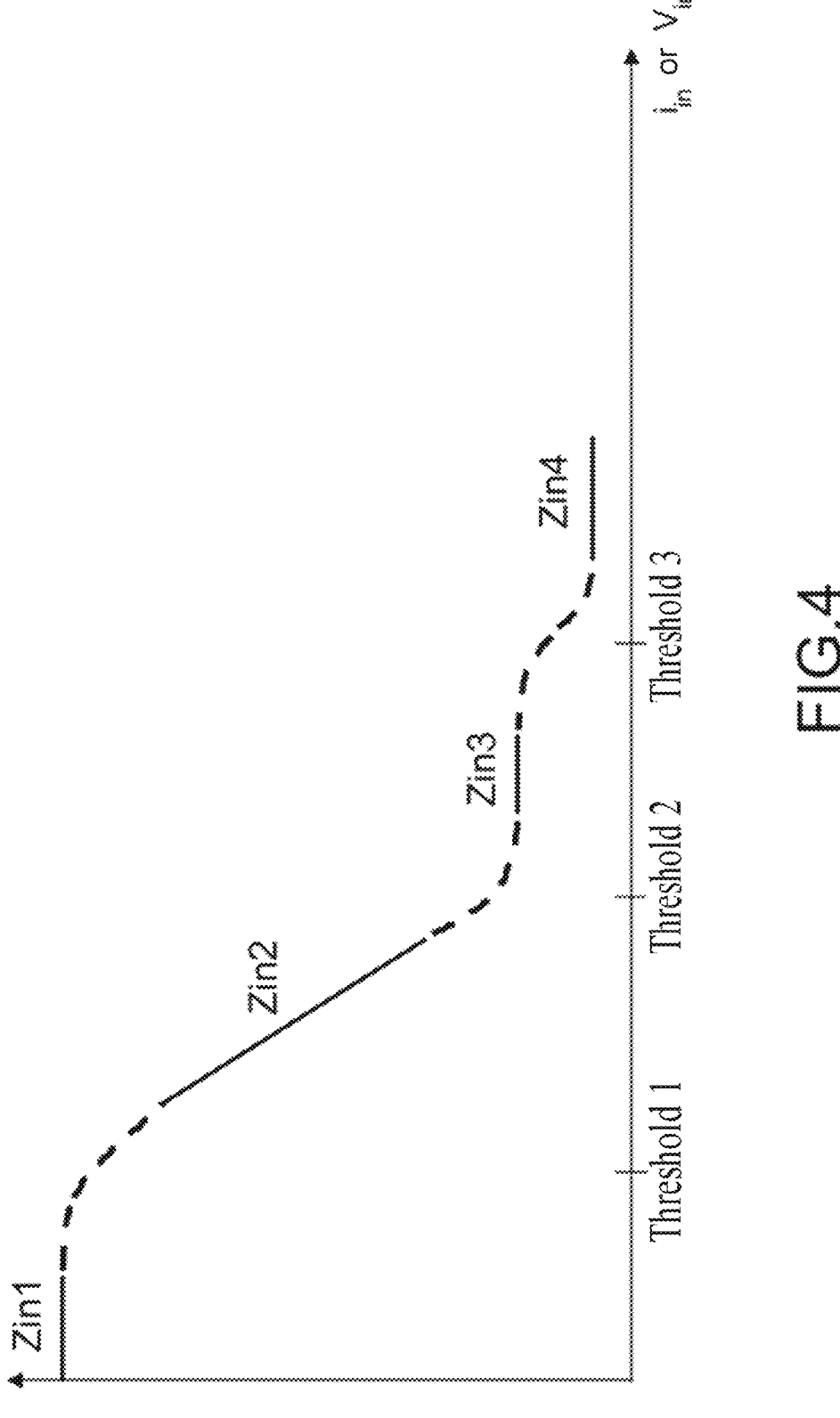
FIG. 4 is a graph representing the trend of the impedance as seen by the transducer, for different amplitude values of the electrical signal.

It is possible to conduct as many impedance measurements Zin at as many amplitudes as may be desired, for example to confirm a measurement, but also to obtain a position with respect to the thresholds of the nonlinearity or nonlinearities:

It is for example possible to start from a very low measurement amplitude and to raise it progressively until a change of impedance is obtained and a first nonlinearity is thus detected, as illustrated for example by FIG. 4, it being understood that this is a symbolic representation of the impedance, which has a real component (the modulus) and an imaginary component (the argument).

In the context of the abovementioned embodiment for determining the air gap value of the sensor, it is possible to continue this progression to detect a second nonlinearity, and so on to detect all the nonlinearities and thus know what amplitude to apply to make the right differentiation measurements to find the information on the physical sensor.

The solid line portions (Zin1, Zin2, Zin3, Zin4) represent tangential trends of the impedance of the sensor 1. When a tangential trend is inclined, that means that it has one component which depends on the amplitude of the electrical signal at the terminals of the transducer 2 (current intensity $i_{in}$ or voltage $V_{in}$). When it is horizontal, it is substantially constant within the amplitude range considered.

The dotted line portions represent the junctions between the tangential trends of the impedance of the sensor 1. It is thus possible to determine impedance change thresholds (threshold 1, threshold 2, threshold 3).

The information to be measured can be deduced from the impedance values Zin in the tangential zones or even from the value of the impedance change thresholds threshold1, threshold 2, etc.

To overcome the effects of the channel, the principle consists therefore in performing a relative identification (threshold 2, threshold 3 with respect to threshold 1), in a way similar to the Equation (1).

A measurement Mes of the air gap value of the sensor can thus, as a variant to the Equation (1), be deduced by relative ratios of the thresholds between the tangential zones, using the following formula:

$$\text{Mes}=\alpha.(\text{threshold 2}-\text{threshold 1})/(\text{threshold 3}-\text{threshold 1})+\beta \qquad (2)$$

The determination of the state of the sensor can thus be extended to the determination of the air gap value.

Figure 5:
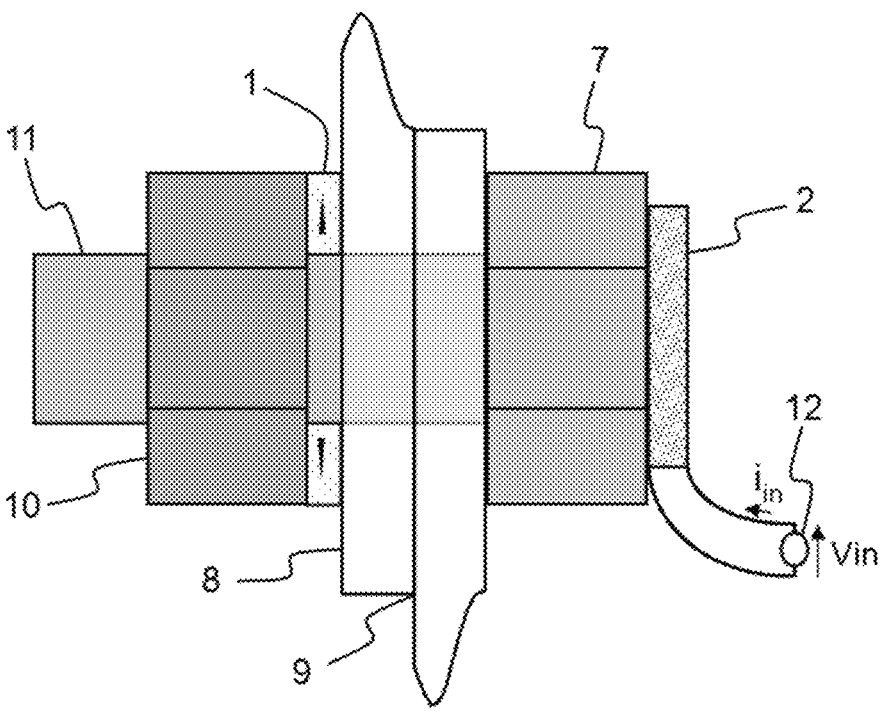
FIG. 5 illustrates a system for implementing the method for determining the level of clamping of mechanical parts according to the invention.

FIG. 5 illustrates an example of application of the method according to the invention, to the determination of the level of clamping of mechanical parts (8, 9) disposed between a first clamping head 7 and a second clamping head 10. A sensor 1 whose electrical behaviour is nonlinear as a function of the pressure exerted against said sensor 1 being disposed between the clamping heads (7, 10). An electromechanical transducer 2 is coupled to one of the clamping heads.

According to one embodiment, the first clamping head 7 is a screwhead, the second clamping head 10 is a nut, and the sensor 1 is incorporated in a washer. It is thus possible to measure the clamping force of the screw.

The sensor 1 can also measure its temperature, for example with an additional air gap in a zone dependent on the temperature and that exhibits a different nonlinearity threshold.

Since the mechanical displacements are very small, it may be wise to use very precise methods (of the order of a few nanometres to a few microns), such as those used in microelectronics to fabricate microelectromechanical systems (MEMS).

According to embodiments, it is advantageous to deposit layers of a few nanometres, with a precision of around a nanometre. It is also advantageous to implement etching methods to structure such layers. Moreover, it is preferable to implement effective bonding methods, such as molecular bonding, to ensure an effective propagation of the acoustic waves.

It is also possible to combine several air gap values. One of the benefits is to be able to create a reference nonlinearity which ideally does not depend on the parameter to be measured and a second which depends on the parameter to be measured. The reference nonlinearity then makes it possible to identify a reference amplitude in order to then conduct an accurate differential measurement of the parameter to be measured.

FIGS. 6 to 14 illustrate different embodiments of the profile of the sensor 1.

Figure 6:
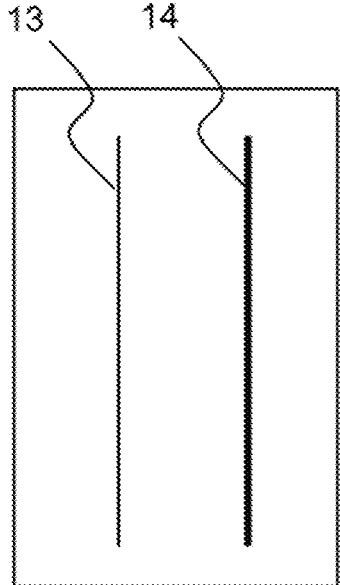
FIGS. 6 to 14 illustrate different air gap sensor profiles used in the system according to the invention.

In the embodiment illustrated by FIG. 6, the sensor 1 comprises a first air gap 13 and a second air gap 14, both of which have a rectilinear profile. The first air gap 13 and the second air gap 14 are superposed, and the first air gap 13 and the second air gap 14 comprise different inter-plate spacings.

If an electromechanical transducer placed on the left is considered, a first amplitude is detected at which the mechanical oscillation on the left wall of the air gap 13 reaches the right wall of this air gap.

Above this amplitude, the right side of this first air gap is made to vibrate, which modifies the mechanical impedance as seen by the electromechanical transducer, and therefore there is a change of electrical impedance at the terminals of the transducer.

When the plate placed between the two air gaps picks up and propagates a certain vibratory amplitude, its right face ends up touching the other side of the second air gap 14.

Beyond this amplitude, the right wall of the second air gap is set to vibrate, which modifies the electrical impedance on the electromechanical transducer.

The first air gap 13 can serve as reference, that is to say that its value does not depend on the parameter to be measured. Thus, the amplitude which causes contact of the first air gap defines a first reference amplitude.

By detecting the contact amplitude on the second air gap 14 and comparing it to the reference amplitude, the value of the second air gap 14 can for example be deduced therefrom.

Figure 7:
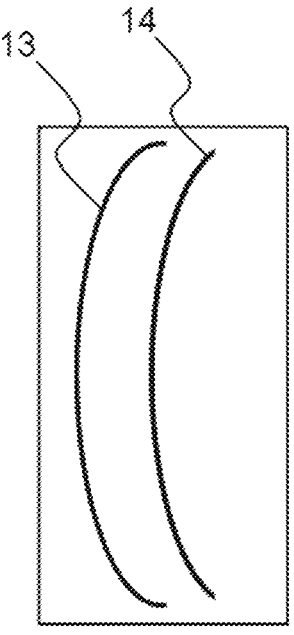

As a variant, the two profiles can be dished, as illustrated by FIG. 7, the first air gap 13 and the second air gap 14 comprising different inter-plate spacings.

For the abovementioned embodiments, it is considered that the acoustic wavelength is less than the thickness of each of the layers.

Figure 8:
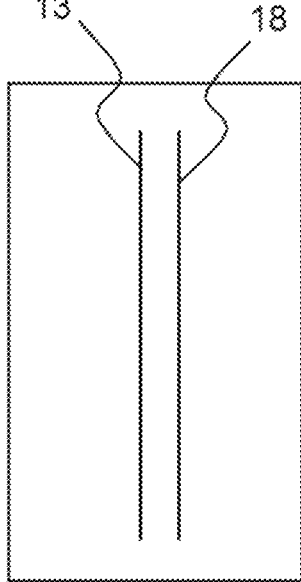

According to a variant illustrated by FIG. 8, the sensor 1 comprises a first air gap 17 and a second air gap 18, the first air gap 17 and the second air gap 18 both having a rectilinear profile. The first air gap 17 and the second air gap 18 are superposed and sufficiently close to one another for them to form a diaphragm, whose thickness is less than the wavelength of the acoustic wave being propagated in the sensor.

The wave is therefore no longer propagated in the thickness of the diaphragm, but it is all of the diaphragm which is displaced to form the equivalent of a vibrating diaphragm.

The diaphragm is driven in motion by its lateral attachment points and is liable to resonate on one or more resonance modes. The amplitude of oscillation of this diaphragm is however limited in amplitude by the value of the air gap on the right and/or on the left of the diaphragm. This contacting on at least one of the two air gaps can be detected via the detection of a change of impedance on the electromechanical transducer 2.

The resonance frequency and/or the mechanical amplification factor of the diaphragm depends for example on the physical parameter to be measured, according to one or other of the following embodiments:

for a force sensor or a strain gauge, the resonance frequency depends on the mechanical tension on the diaphragm;

for a gas pressure sensor, the mechanical damping depends on the pressure/on the type of gas present in the air gap or air gaps;

for a gas pressure sensor, the air cushion effect which depends on the pressure/on the type of gas present in the air gap or air gaps can modify the resonance frequency as a function of the amplitude of oscillation of the diaphragm;

for a liquid sensor, the presence of a liquid in the air gap causes the diaphragm effect to appear or disappear to a greater or lesser extent (example: application to the measurement of a fuel level, oil presence, sealing check, etc);

for a temperature sensor, the difference in thermal expansion between the diaphragm and the support causes a modification of the pre-tension of the diaphragm and therefore of its resonance frequency;

for a humidity sensor, the resonance frequency of a diaphragm composed of a material which absorbs humidity is altered.

Moreover, on one side of the diaphragm, there may be a gas with a reference pressure and on the other side, a gas whose pressure has to be measured. Depending on whether the pressure of the gas to be measured is greater or less than the pressure of the reference gas, the diaphragm will be offset to the left or to the right. It is then possible to measure the difference in behaviour and, more particularly, if the diaphragm goes into contact on the left or on the right, blocking any vibration of the diaphragm (no change of electrical impedance with the amplitude).

As a variant, both profiles can be dished. Concerning a lateral tension, the tension tends more to modify the "bulge" and therefore the initial position than simply to change the resonance frequency.

Figure 9:
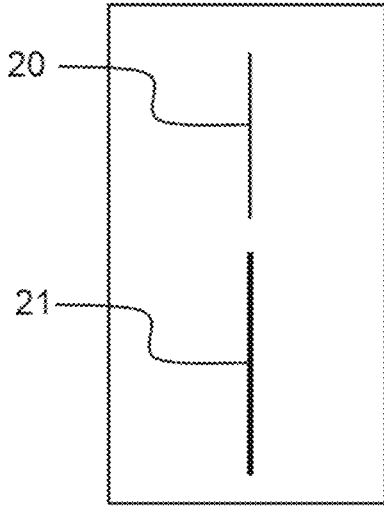

According to another embodiment illustrated by FIG. 9, the sensor 1 comprises a first air gap 20 and a second air gap 21 which both have a rectilinear profile. The first air gap 20 and the second air gap 21 are aligned. The first air gap 20 and the second air gap 21 comprise different inter-plate spacings.

Figure 10:
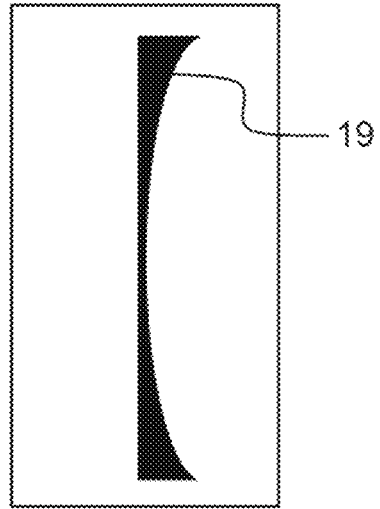

According to another embodiment illustrated by FIG. 10, the sensor 1 comprises an air gap 19 having a profile whose thickness varies progressively. Thus, the surface which enters into contact with the amplitude of the vibration increases progressively. Moreover, the initial air gap surface in contact may depend for example on a compression force, which makes it possible to have a progressive force sensor.

Figure 11:
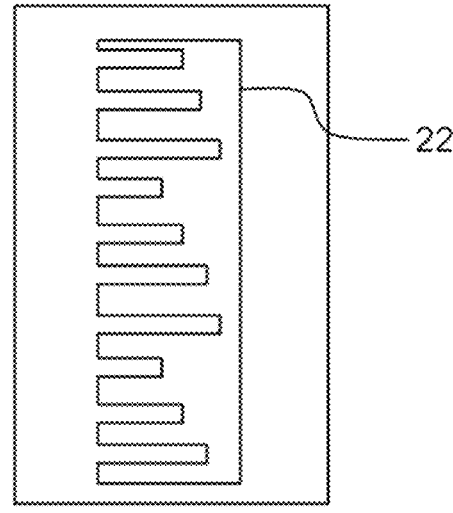

According to another embodiment illustrated by FIG. 11, the sensor 1 comprises an air gap 22 having a serrated profile, the height of at least some of the serrations being variable. The effect is similar to the profile whose thickness varies progressively, but in a discretized manner.

Figure 12:
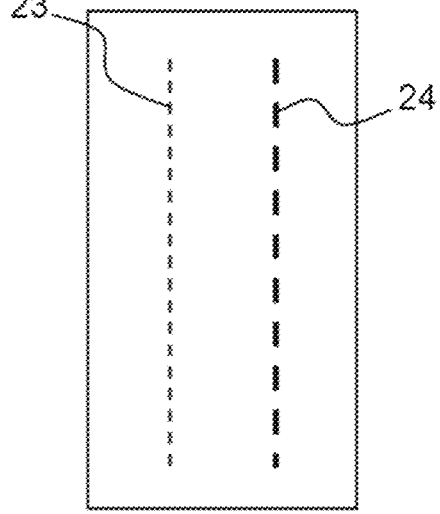

According to another embodiment illustrated by FIG. 12, the air gap is produced in the form of a disjointed repeated pattern (23, 24). This embodiment is particularly useful if the mechanical requirements necessitate small elementary patterns.

Figure 13:
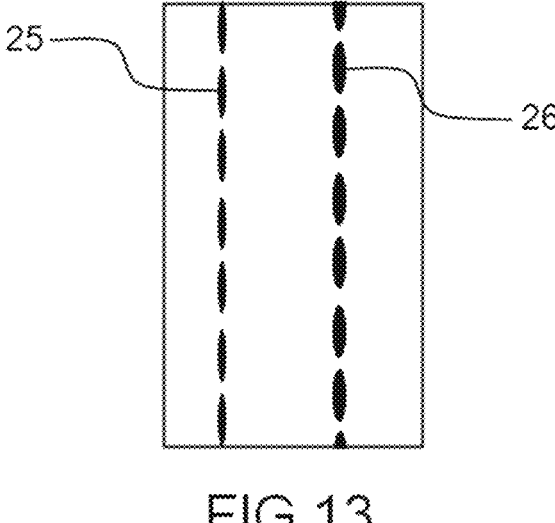

According to another embodiment illustrated by FIG. 13, the sensor 1 comprises a first air gap 25 and a second air gap 26, produced in the form of a repeated pattern. The first air gap 25 and the second air gap 26 are superposed, the edge of each pattern of the first air gap 25 being aligned with the centre of a pattern of the second air gap 26, and vice versa.

The mechanical parts which edge the first air gaps are substantially aligned with the centres of the zones of the second air gaps, and vice versa. These edging mechanical parts are for example distributed shims or gratings.

This has the advantage that the acoustic wave can thus easily propagate through these mechanical parts to reach the other air gap.

The structure obtains good flexibility through the thickness because there is no rigid block which passes through and directly links the left surface to the right surface. This flexibility for example makes it possible to make a force or deformation sensor that is relatively flexible to be sensitive to forces of low value.

The rounded form is an option to give a progressive aspect, but other forms can be envisaged.

Figure 14:
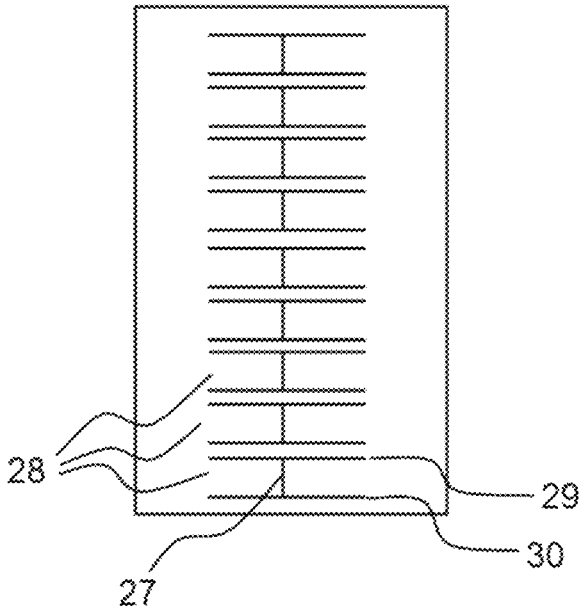

According to another embodiment illustrated by FIG. 14, the different repeated patterns constituting the air gap 28 each comprise a rectilinear air gap part 27, that can be brought into contact when a pressure is exerted against the sensor, and two pillars (29, 30) disposed on either side of the rectilinear air gap part 27, at right angles to said air gap part.

This embodiment makes it possible to benefit from elongate pillars to give a certain flexibility in elongation while the air gap is, for its part, very small, compared to the length of these pillars. If, for example, the air gap at rest measures 10 μm and the pillars measure 1 mm, a pressure which deforms the length of the pillars by 1% is sufficient to generate contact in the air gap.

The invention claimed is:

1. A method for determining the state of at least one sensor whose mechanical behaviour is nonlinear as a function of the amplitude of the pressure exerted against said sensor, said sensor and an electromechanical transducer being in contact with a support, the method comprising the steps of:

applying an electrical signal (Vin) at a first amplitude to the terminals of the electromechanical transducer at different frequencies by means of a sensor state determination unit which comprises a voltage source, or a current source, which is electrically connected to the electromechanical transducer so as to impose respectively a sinusoidal voltage at a predefined maximum amplitude, or a sinusoidal current at a predefined maximum amplitude, performing a plurality of measurements of the impedance as seen by the electromechanical transducer for said frequencies, and determining a first set of values (Mod1, Arg1) based on said plurality of measurements;

applying said electrical signal (Vin) at a second amplitude at different frequencies, performing a plurality of measurements of the impedance as seen by the electromechanical transducer for said frequencies of the signal, and determining a second set of values (Mod2, Arg2) based on said plurality of measurements of the impedance;

measuring a deviation between the first set of values (Mod1, Arg1) and the second set of values (Mod2, Arg2); and determining a state of the sensor as a function of the deviation between the first set of values (Mod1, Arg1) and the second set of values (Mod2, Arg2).

2. The method according to claim 1, wherein the sensor is a capacitive air gap sensor which comprises at least one air gap, the step of determination of a state of the sensor comprising a determination of the air gap, and wherein:

the air gap is considered nil if the deviation between the first set of values (Mod1, Arg1) and the second set of values (Mod2, Arg2) is lower than a predetermined deviation value; and the air gap is considered non-zero if the deviation between the first set of values (Mod1, Arg1) and the second set of values (Mod2, Arg2) is above said predetermined deviation value.

3. The method according to claim 1, wherein the sensor is a capacitive air gap sensor which comprises at least one air gap, the method comprising the steps of:

determining a first value (Mod1, Arg1) of a parameter characteristic of the electrical impedance of the first electromechanical transducer, at the first amplitude, determining a second value (Mod2, Arg2) of a parameter characteristic of the electrical impedance of the first electromechanical transducer, at the second amplitude, the first value and the second value being such that the deviation is non-zero, applying the electrical signal at a third amplitude, the third amplitude lying between the first amplitude and the second amplitude, and determining a third value (Mod3, Arg3) of a parameter characteristic of the electrical impedance of the first electromechanical transducer, at the third amplitude, and determining the air gap as a function of the first value, of the second value, and of the third value.

4. A system for determining the state of at least one sensor whose mechanical behaviour is nonlinear as a function of the amplitude of the pressure exerted against said sensor, said sensor and an electromechanical transducer being in contact with a support, the system comprising a sensor state determination unit, the sensor state determination unit being configured to:

apply an electrical signal (Vin) at a first amplitude to the terminals of the electromechanical transducer at different frequencies by means of a sensor state determination unit which comprises a voltage source, or a current source, which is electrically connected to the electromechanical transducer so as to impose respectively a sinusoidal voltage at a predefined maximum amplitude, or a sinusoidal current at a predefined maximum amplitude, perform a plurality of measurements of the impedance as seen by the electromechanical transducer for said frequencies, and determine a first set of values (Mod1, Arg1) based on said plurality of measurements;

apply said electrical signal (Vin) at a second amplitude at different frequencies, perform a plurality of measurements of the impedance as seen by the electromechanical transducer for said frequencies of the signal, and determine a second set of values (Mod2, Arg2) based on said plurality of measurements;

measure a deviation between the first set of values (Mod1, Arg1) and the second set of values (Mod2, Arg2); and determine a state of the sensor as a function of the deviation between the first set of values (Mod1, Arg1) and the second set of values (Mod2, Arg2).

5. The system according to claim 4, wherein the sensor is a capacitive air gap sensor which comprises: a first air gap and a second air gap, the first air gap and the second air gap both having a rectilinear profile or a dished profile, the first air gap and the second air gap being superposed and sufficiently close to one another, such that they form a diaphragm, whose thickness is less than a wavelength of an acoustic wave being propagated in the sensor.

6. The system according to claim 4, wherein the sensor is a force sensor, or a strain gauge, or a gas pressure sensor, or a liquid sensor, or a temperature sensor, or a humid sensor.

7. The system according to claim 4, wherein the sensor comprises at least one air gap.

8. The system according to claim 7, wherein said at least one air gap is produced in the form of a disjointed repeated pattern.

9. The system according to claim 4, wherein the sensor comprises a first air gap and a second air gap, the first air gap and the second air gap both having a rectilinear profile or a dished profile, the first air gap and the second air gap being superposed, the first air gap and the second air gap comprising different inter-plate spacings.

10. The system according to claim 4, wherein the sensor comprises a first air gap and a second air gap, the first air gap and the second air gap both having a rectilinear profile, the first air gap and the second air gap being aligned, the first air gap and the second air gap comprising different inter-plate spacings.

11. The system according to claim 4, wherein the sensor comprises an air gap having a profile whose thickness varies progressively.

12. The system according to claim 4, wherein the sensor comprises an air gap having a serrated profile, the height of at least some of the serrations being variable.

13. The system according to claim 8, wherein the sensor comprises a first air gap and a second air gap, produced in the form of a repeated pattern, the first air gap and the second air gap being superposed, the edge of each pattern of the first air gap being aligned with the centre of a pattern of the second air gap, and vice versa.

14. The system according to claim 8, wherein the pattern comprises a rectilinear air gap part, that can be brought into contact when a pressure is exerted against the sensor, and two pillars disposed on either side of the rectilinear air gap part, at right angles to said air gap part.

* * * * *